United States Patent
Baumgartner

(10) Patent No.: US 7,661,265 B2
(45) Date of Patent: Feb. 16, 2010

(54) EXHAUST GAS SYSTEM FOR AN INTERNAL COMBUSTION ENGINE

(75) Inventor: Thomas Baumgartner, Neuhofen (AT)

(73) Assignee: MAN Nutzfahrzeuge Osterreich AG (AT)

( * ) Notice: Subject to any disclaimer, the term of this patent is extended or adjusted under 35 U.S.C. 154(b) by 489 days.

(21) Appl. No.: 11/744,312

(22) Filed: May 4, 2007

(65) Prior Publication Data
US 2008/0271442 A1 Nov. 6, 2008

(51) Int. Cl.
 *F01N 3/00* (2006.01)
(52) U.S. Cl. .............................. 60/286; 60/295; 60/297; 60/299; 60/301; 60/303; 422/170; 422/172; 422/182
(58) Field of Classification Search .................. 60/60, 60/280, 286, 295, 297, 299, 301, 302, 303; 422/169, 170, 172, 177, 182
See application file for complete search history.

(56) References Cited

U.S. PATENT DOCUMENTS

| | | | |
|---|---|---|---|
| 5,233,830 A | | 8/1993 | Takeshima et al. |
| 5,950,423 A | * | 9/1999 | Hampton ..................... 60/274 |
| 6,871,490 B2 | * | 3/2005 | Liang et al. ................... 60/286 |
| 6,878,359 B1 | * | 4/2005 | Mathes et al. ............ 423/239.1 |
| 6,928,806 B2 | * | 8/2005 | Tennison et al. .............. 60/286 |
| 7,028,465 B2 | * | 4/2006 | Ripper et al. ................. 60/286 |
| 7,533,522 B2 | * | 5/2009 | Klein .......................... 60/286 |
| 7,552,583 B2 | * | 6/2009 | Robel et al. .................. 60/286 |

FOREIGN PATENT DOCUMENTS

| | | |
|---|---|---|
| DE | 10123359 | 11/2002 |
| DE | 10218255 | 11/2003 |
| DE | 10322963 | 12/2003 |
| GB | 2389918 | * 12/2003 |

* cited by examiner

*Primary Examiner*—Binh Q Tran
(74) *Attorney, Agent, or Firm*—Robert W. Becker; Robert W. Becker & Assoc.

(57) ABSTRACT

An exhaust gas system for an internal combustion engine, comprising an oxidation catalytic converter disposed in a first exhaust gas manifold section with which the exhaust gas outlets of a first portion of the cylinders communicate, and a hydrolysis catalytic converter disposed in a second exhaust gas manifold section with which the exhaust gas outlets of the remaining portion of the cylinders communicate. The hydrolysis catalytic converter, together with the oxidation catalytic converter that annularly surrounds it, are installed in a common housing. A tubular portion of the second exhaust gas manifold section extends into the housing and accommodates the hydrolysis catalytic converter in its end portion. A tubular portion of a first exhaust gas manifold section surrounds the tubular portion of the second exhaust gas manifold section, resulting in an annular in-flow chamber for the oxidation catalytic converter that simultaneously serves as a heating chamber. A reduction agent, from which ammonia can be produced by the hydrolysis catalytic converter, can be introduced by a nozzle into the tubular portion of the second exhaust gas manifold section upstream of the hydrolysis converter.

19 Claims, 2 Drawing Sheets

EXHAUST GAS SYSTEM FOR AN INTERNAL COMBUSTION ENGINE

The instant application should be granted the priority date of May 5, 2006 the filing date of the corresponding Austrian patent application A773/2006.

BACKGROUND OF THE INVENTION

The present invention relates to an exhaust gas system for an internal combustion engine, especially of a commercial vehicle.

The present application proceeds from DE 103 22 963 A1, FIGS. 2A and 2C of which disclose an exhaust gas system of a multi-cylinder internal combustion engine, according to which the exhaust gas outlets of a portion of the cylinders communicate with a first exhaust gas manifold section, and the exhaust gas outlets of the other portion of the cylinders communicate with a second exhaust gas manifold section, whereby a catalytic converter is disposed in each of the exhaust gas manifold sections. However, this document provides no discussion regarding the type of catalytic converters that are disposed in the individual exhaust gas manifold sections. DE 101 23 359 A1 discloses in FIG. 21 and the associated text the provision of a muffler in an exhaust gas manifold, whereby a hydrolysis catalytic converter, and at least one oxidation catalytic converter, can have flow through them in parallel in the muffler. A reduction agent is metered into the inlet region of the hydrolysis catalytic converter, with ammonia being produced by the reaction agent. The oxidation catalytic converter serves for the conversion of NO into $NO_2$. This type of adjacent arrangement of two catalytic converters in the muffler, which is a preliminary muffler, can leave undesired, non-uniform flow through the muffler, which can effect either an $NO_2$ production that is too high, or a non-complete conversion of the reduction agent accompanied by harmful separation products such as isocyanic acid or solid cyanuric acid particles.

It is therefore an object of the present invention to provide an exhaust gas post treatment device in an exhaust gas system of an internal combustion engine of the aforementioned general type, according to which, due to the selection and arrangement of the catalytic converters, the problems that can occur with the parallel arrangement of the catalytic converters in the muffler of DE 101 23 359 A1 are eliminated.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
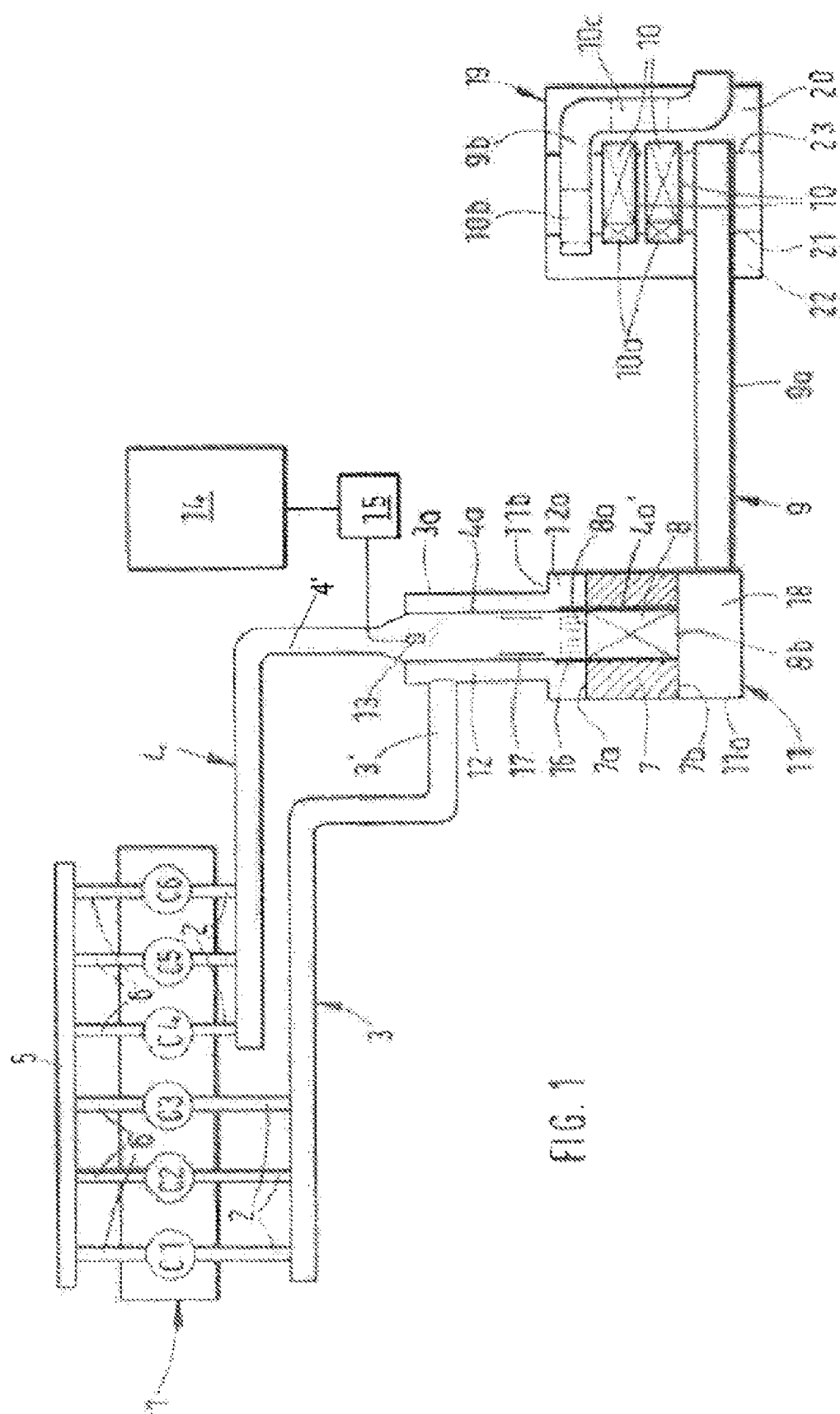
FIG. 1 shows, as a multi-cylinder internal combustion engine, a 6-cylinder in-line engine having a first exemplary embodiment of the inventive exhaust gas system.

The exhaust gas system of the present application comprises an oxidation catalytic converter disposed in a first exhaust gas manifold section, wherein nitric oxide contained in the exhaust gas that flows through is adapted to be converted by the oxidation catalytic converter into nitrogen dioxide; a hydrolysis catalytic converter disposed in a second exhaust gas manifold section, wherein the hydrolysis catalytic converter surrounds the oxidation catalytic converter in an annular manner, and wherein downstream of the oxidation and hydrolysis catalytic converters, the first and second exhaust gas manifold sections discharge into a common main exhaust gas manifold; at least one further catalytic converter disposed in the main exhaust gas manifold; a housing, wherein the oxidation and hydrolysis catalytic converters are installed in the housing wherein the second exhaust gas manifold section is provided with a tubular portion that extends into the housing, wherein the tubular portion has an end portion that accommodates the hydrolysis catalytic converter, wherein the first exhaust gas manifold section is provided with a tubular portion that extends about, and is spaced from, the tubular portion of the second exhaust gas manifold section to form an annular in-flow chamber for the oxidation catalytic converter, and wherein the annular in-flow chamber simultaneously serves as a heating chamber; and a nozzle for introducing a reduction agent into the tubular portion of the second exhaust gas manifold section upstream of the hydrolysis catalytic converter, wherein ammonia is adapted to be produced from the reduction agent via the hydrolysis catalytic converter.

As a consequence of the inventive arrangement of the oxidation catalytic converter annularly about the hydrolysis catalytic converter in a common housing, and in its pertaining exhaust gas manifold section, each of these two catalytic converters is always acted upon by a defined exhaust gas stream. Thus, due to the fact that they are separated from one another, and flow is provided to them separately, the functionalities of the two catalytic converters do not mutually interfere with one another, but rather are fully effective. In other words, a defined exhaust gas stream flows through the oxidation catalytic converter, in which a defined quantity of the NO is converted into $NO_2$ Associated with the hydrolysis catalytic converter is a defined metering in stretch for the reduction agent formed by the upstream tubular portion of the pertaining exhaust gas manifold section; the reduction agent can be entirely evaporated in the metering-in stretch. Downstream of the catalytic converters, the two at that point still different gas streams are joined together in the housing, are then thoroughly mixed in the further main exhaust gas manifold in an adequately long mixing zone, and are subsequently conveyed through the SCR catalytic converter or converters as well as possibly through further catalytic converters. Of particular advantage is that due to the arrangement of the tubular portion of that exhaust gas manifold section that contains the hydrolysis catalytic converter, an annular heating chamber is also provided in the tubular portion of the other exhaust gas manifold section. The inner tubular portion can be heated or kept warm by the heating chamber, which enhances the evaporation of the reduction agent.

Further specific features and advantages of the present application will be described in detail subsequently.

DESCRIPTION OF SPECIFIC EMBODIMENTS

Figure 2:
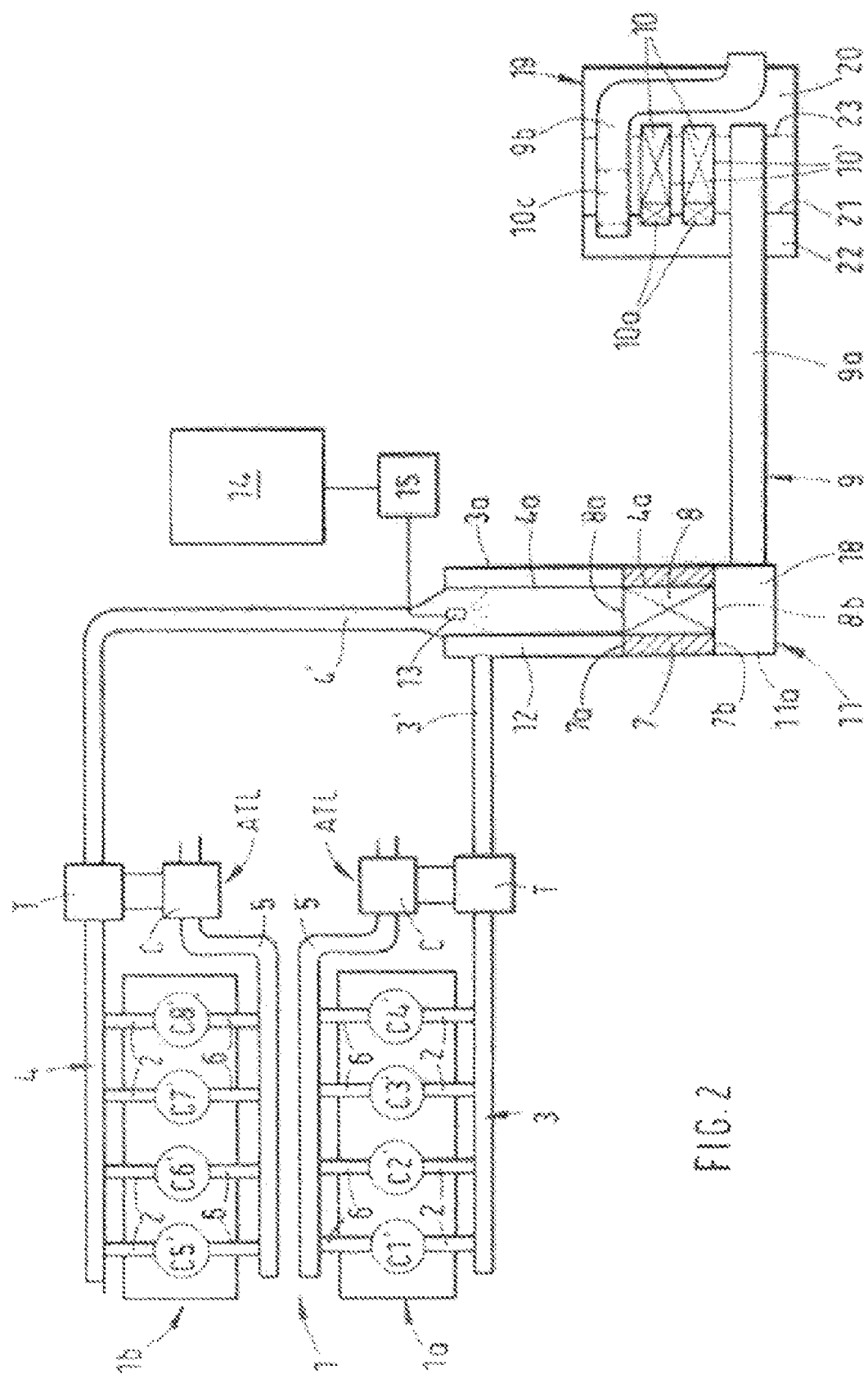
FIG. 2 shows, as a multi-cylinder internal combustion engine, an 8-cylinder V engine having a second exemplary embodiment of the inventive exhaust gas system.

Referring now to the drawings in detail, in the figures an internal combustion engine is designated by the reference numeral 1 and serves, for example, as the drive source of a vehicle or of a stationary power unit. In FIG. 1, this internal combustion engine 1 is a 6-cylinder in-line engine, the cylinders of which are designated as C1, C2, C3, C4, C5 and C6. In FIG. 2, the internal combustion engine 1 is formed by an 8-cylinder V engine, the cylinders of which are designated as C1', C2', C3', C4', C5', C6', C7', C8', and the two banks or rows of cylinders of which are designated as 1a, 1b. The exhaust gas outlets of the cylinders are designated by the reference numeral 2.

With each internal combustion engine 1, the exhaust gas outlets 2 of a portion of the cylinders (C1, C2, C3 in FIG. 1; C1', C2', C3, C4' in FIG. 2) are connected to or communicate with a first exhaust gas manifold branch or section 3, and the exhaust gas outlets 2 of the remaining cylinders (C4, C5, C6 in FIG. 1; C5', C6', C7', C8' in FIG. 2) are connected to or communicate with a second exhaust gas manifold branch or section 4. The reference numeral 5 designates a charge air line, from which the cylinders of the internal combustion engines 1 are supplied with intake air or charge air via inlets 6. A catalyzer or catalytic converter 7 or 8 respectively is disposed in each of the two exhaust gas manifold sections 3, 4. Downstream of these catalytic converters 7,8, the two exhaust gas manifold sections 3,4 are joined to form a then common main exhaust gas line or manifold 9, in which is disposed at least one further catalytic converter 10.

With the V engine of FIG. 2, each of the exhaust gas manifold sections 3,4 is directed, upstream of the respective catalytic converter 7,8, through the turbine T of a turbocharger ATL, by means of the compressor C of which the charge air line 5 can be supplied with charge air.

Pursuant to the present invention, the catalytic converter 7 that is disposed in the first exhaust gas manifold section 3 is formed by an oxidation catalytic converter via which the nitric oxide (NO) contained in the exhaust gas that flows through is converted into nitrogen dioxide ($NO_2$). Furthermore, the catalytic converter 8 that is disposed in the second exhaust gas manifold section 4 is formed by a hydrolysis catalytic converter. The hydrolysis catalytic converter 8, together with the oxidation catalytic converter 7, are installed in a common housing 11. In this connection, the oxidation catalytic converter 7 surrounds the cylindrical hydrolysis catalytic converter 8 in an annular or ring-shaped manner. The second exhaust gas manifold section 4 is provided with a tubular portion 4a that is introduced into the housing 11; an end portion 4a' of the tubular portion 4a accommodates the hydrolysis catalytic converter 8. The first exhaust gas manifold section 3 is provided with a tubular portion 3a that extends around, and is spaced from, the tubular portion 4a of the second exhaust gas manifold section 4. As a result, an annular in-low chamber 12 is provided in the first exhaust gas manifold section 3 for the exhaust gas that is to be conveyed to the oxidation catalytic converter 7. At the same time, this in-flow chamber 12 also forms a heating chambers from which exhaust gas heat can be transferred to the inner portion 4a of the second exhaust gas manifold section 4 to heat it up or to keep it warm.

Upstream of, and relatively far from, the hydrolysis catalytic converter 8, a reduction agent is introduced into the tubular portion 4a of the second exhaust gas manifold section 4 via a nozzle or jet 13; ammonia can be produced from this reduction agent with the aid of the hydrolysis converter 8. The required quantity of reduction agent is supplied to the nozzle 13 from a supply tank 14 via a metering device 15.

Various details and possible embodiments and amplifications of the inventive exhaust gas system that will be described in detail subsequently.

The hydrolysis catalytic converter 8 preferably has a circular cylindrical configuration, and the oxidation catalytic converter 7 that surrounds it preferably has an annular cylindrical configuration, in which case the two catalytic converters 7,8 are disposed coaxially relative to one another and can have two different gas streams flow through them in a parallel manner.

The oxidation catalytic converter 7 is accommodated in the sleeve-like outer wall 11a of the housing 11. In this connection, the outer housing wall 11a can at the same time form the outer wall of the oxidation catalytic converter 7. Alternatively, the oxidation catalytic converter 7 can have its own outer wall via which it is fitted into the outer housing wall 11a.

The tubular portion 3a of the first exhaust gas manifold section 3 can, as shown in FIG. 2, have the same diameter as does the outer wall 11a of the housing 11. The tubular portion 3a and the outer housing wall 11a can, for example be formed by a common tube or by two interconnected tubular portions. Alternatively, the tubular portion 3a as shown in FIG. 1, could also have a smaller diameter than does the outer wall 11a of the housing 11, and in the housing 11, in the zone upstream of the annular entry area 7a of the oxidation catalytic converter 7, an annular flow-in chamber can be formed about the tubular portion 4a, 4a' of the second exhaust gas manifold section 4; this flow-chamber 12a communicates with the in-flow chamber 12 and is delimited relative to the portion 3a by a housing wall section 11b.

The tubular portion 4a of the second exhaust gas manifold section 4 is preferably disposed coaxially in the tubular portion 3a of the first exhaust gas manifold section 3 and preferably has a diameter that corresponds approximately to 0.5 to 0.7 times the diameter of the cylindrical outer wall 11a of the housing 11. The tubular portion 4a of the second exhaust gas manifold section 4 can, as shown in FIG. 2 be formed by a monolithic, linear tubular portion in the end region of which is installed the hydrolysis catalytic converter 8. Alternatively the tubular portion 4a, as shown in FIG. 1 can also be formed by two tubular portions 4a, 4a' that are inserted into and are connected to one another, whereby the hydrolysis catalytic converter 8 is installed into the tubular portion 4a'. In this connection, the tubular portion 4a or 4a' can at the same time form not only the outer housing wall of the hydrolysis catalytic converter 8 but also the inner housing wall for the annular oxidation catalytic converter 7, or can serve as a support for the latter.

If the reduction agent is an aqueous urea solution, a flow mixer 16, and if desired additionally an evaporator or a heating device 17, can be disposed upstream of the hydrolysis converter 8. These options are illustrated in FIG. 1. The flow mixer 16 is installed in the tubular portion 4a of the second exhaust gas manifold section 4, or at the inlet of the partial portion 4a' thereof, and serves for the thorough mixing of the reduction agent, introduced or sprayed in via the nozzle 13, with the exhaust gas, as well as for the homogenization of the distribution of this gas mixture over the entire entry area 8a of the hydrolysis catalytic converter 8. The additional evaporator or heating device 17 can be disposed in the tubular portion 4a of the second exhaust gas manifold section 43 in particular in the region between the introduction location for the reduction agent and the flow mixer 16, and serves to accelerate the evaporation of the reduction agent or, if the exhaust gas temperature is too low, to raise the temperature thereof in the portion 4a of the second exhaust gas manifold section 4.

The section 3' of the first exhaust gas manifold section 3 discharges laterally into the tubular portion 3a, either at an angle or perpendicular to the longitudinal axis thereof. The section 4' of the second exhaust gas manifold section 4 discharges coaxially into the tubular portion 4a.

A common discharge chamber 18 is formed in the housing 11 adjoining the exit areas 7b of the oxidation catalytic converter 7 and 8b of the hydrolysis catalytic converter 8 respectively. The discharge chamber 18 is part of the common main exhaust gas line or manifold 9, and together with a subsequent tubular portion 9a of the latter forms an adequately long mixing zone for the two gas streams that exit the exhaust gas manifold sections 3, 4 and are then combined.

The housing 11 can serve either merely as an accommodation element for the catalytic converter 7, 8, or can additionally also be embodied as a (preliminary) muffler.

The at least one further catalytic converter 10 in the main exhaust gas manifold 9 comprises one or more SCR(Selective Catalytic Reduction)-type catalytic converter or converters, for example ammonia (NH$_3$) suppression catalytic converter or converters 10a, particle oxidation catalytic converter or converters 10b, and nitrogen dioxide (NO$_2$) suppression catalytic converter or converters 10c.

In the embodiment of FIG. 1, all of the aforementioned catalytic converters 10a, 10b, 10c are provided, with flow occurring successively through them. In the embodiment of FIG. 2, only the catalytic converters 10a, 10c are provided. In both embodiments, a (main) muffler 19 is provided in the main exhaust gas manifold 9, with the catalytic converters 10, 10a, 10b or 10c being installed in the muffler 19. A tubular portion 9a of the main exhaust gas manifold 9 extends into the interior of the muffler 19, where it discharges into a downstream intake chamber 20, which is separated from a forward discharge chamber 22 by a wall 21 that is not permeable to gas. Several catalytic converter modules 10' are fixed in position by this wall 21 and by a gas-permeable support wall 23. At least an SCR catalytic converter 10 and an ammonia suppression catalytic converter 10a are grouped together in each of the catalytic converter modules 10'. The two catalytic converter modules are disposed parallel to one another, wherein the exhaust gas/ammonia mixture that is supplied can flow through them. From the discharge chamber 22, a final stage pipe or conduit 9b leads out of the muffler 19. In the embodiment of FIG. 1, a panicle oxidation catalytic converter 10b followed by a nitrogen dioxide suppression catalytic converter 10c are installed in the final stage conduit 9b. In the embodiment of FIG. 2, the particle oxidation catalytic converter 10b is absent; otherwise, the arrangement of FIG. 2 corresponds to that of FIG. 1. The muffler 19 illustrated in FIGS. 1 and 2 along with its catalytic converters, is used, for example, in trucks or busses, where a particularly compact arrangement is absolutely necessary. In instances where sufficient space is available, for example stationary power units such as cogeneration plants or emergency sets, the catalytic converters 10, 10a, 10b, 10c could also be disposed in a row one after the other in the main exhaust gas manifold 9.

The specification incorporates by reference the disclosure of Austrian priority document A773/2006 filed May 5, 2006.

The present invention is, of course, in no way restricted to the specific disclosure of the specification and drawings, but also encompasses any modifications within the scope of the appended claims.

What I claim is:

1. An exhaust gas system for an internal combustion engine, comprising:
    a first exhaust gas manifold section (3), wherein exhaust gas outlets (2) of a first portion of the cylinders of the engine communicate with said first exhaust gas manifold section (3);
    a second exhaust gas manifold section (4), wherein exhaust gas outlets (2) of a remaining portion of the cylinders of the engine communicate with said second exhaust gas manifold section (4);
    an oxidation catalytic converter (7) disposed in said first exhaust gas manifold section (3), wherein nitric oxide contained in exhaust gas that flows through is adapted to be converted via said oxidation catalytic converter (7) into nitrogen dioxide;
    a hydrolysis catalytic converter (8) disposed in said second exhaust gas manifold section (4), wherein said oxidation catalytic converter (7) surrounds said hydrolysis catalytic converter (8) in an annular manner, and wherein downstream of said oxidation catalytic converter (7) and said hydrolysis catalytic converter (8) said first and second exhaust gas manifold sections (3,4) discharge into a common main exhaust gas manifold (9);
    at least one further catalytic converter (10, 10a, 10b, 10c) disposed in said main exhaust gas manifold (9);
    a housing (11), wherein said catalytic converter and said hydrolysis catalytic converter (8) are installed in said housing, wherein said second exhaust gas manifold section (4) is provided with a tubular portion (4a) that extends into said housing (11), wherein said tubular portion (4a) has an end portion (4a') that accommodates said hydrolysis catalytic converter (8), wherein said first exhaust gas manifold section (3) is provided with a tubular portion (3a) that extends about, and is spaced from, said tubular portion (4a) of said second exhaust gas manifold section (4) to form an annular in-low chamber (12) for said oxidation catalytic converter (7), and wherein said annular in-flow chamber (12) simultaneously serves as a heating chamber; and
    a nozzle (13) for introducing a reduction agent into said tubular portion (4a) of said second exhaust gas manifold section (4) upstream of said hydrolysis catalytic converter (8), wherein ammonia is adapted to be produced from said reduction agent via said hydrolysis catalytic converter (8).

2. An exhaust gas system according to claim 1, wherein said hydrolysis catalytic converter (8) has a circular cylindrical configuration, wherein said oxidation catalytic converter (7) that surrounds said hydrolysis catalytic converter (8) has an annular cylindrical configuration, and wherein said two catalytic converters (7,8) are disposed coaxially within and relative to one another and are adapted to have two different gas streams flow through them in parallel.

3. An exhaust gas system according to claim 1, wherein said oxidation catalytic converter (7) is provided with its own outer wall via which it is fitted into a sleeve-like outer wall (11a) of said housing (11).

4. An exhaust gas system according to claim 1, wherein said housing (11) is provided with a sleeve-like outer wall (11a) that simultaneously forms an outer wall of said oxidation catalytic converter (7) accommodated therein.

5. An exhaust gas system according to claim 1, wherein in said housing (11), in a region upstream of an annular entry area (7a) of said oxidation catalytic converter (7), an annular flow-in chamber (12a) is formed about said tubular portion (4a) of said second exhaust gas manifold section (4), and wherein said flow-in chamber (12a) communicates with said annular inflow chamber (12).

6. An exhaust gas system according to claim 1, wherein a common discharge chamber (18) is provided in said housing (11) following exit areas (7b, 8b) of said oxidation catalytic converter (7) and said hydrolysis catalytic converter (8), wherein said main exhaust gas manifold (9) is provided with a tubular portion (9a), and wherein said discharge chamber (18) forms a portion of said main exhaust gas manifold (9) and together with said tubular portion (9a) thereof forms an adequately long mixing stretch for the two gas streams that exit said first and second exhaust gas manifold sections (3, 4).

7. An exhaust gas system according to claim 1, wherein said tubular portion (3a) of said first exhaust gas manifold (3) is disposed coaxially relative to said tubular portion (4a) of said second exhaust gas manifold section (4).

8. An exhaust gas system according to claim 1, wherein said tubular portion (3a) of said first exhaust gas manifold section (3) has the same diameter as does an outer wall (11a) of said housing (11).

9. An exhaust gas system according to claim 5, wherein said tubular portion (3a) of said first exhaust gas manifold section (3) has a smaller diameter than does an outer wall (11a) of said housing (11), and wherein said flow-in chamber (12a) is delimited by said outer housing wall (11a) as well as by a further wall section (11b) of said housing (11) that is connected with said outer housing wall (11a) and said tubular portion (3a) of said first exhaust gas manifold section (3).

10. An exhaust gas system according to claim 7, wherein said housing (11) is provided with a cylindrical outer wall (11a), and wherein said tubular portion (4a) of said second exhaust gas manifold section (4) has an outer diameter that is approximately 0.3 to 0.7 times a diameter of said cylindrical outer wall (11a).

11. An exhaust gas system according to claim 1, wherein said tubular portion (4a) of said second exhaust gas manifold section (4) is formed by a straight tube or two interconnected tubular pieces, and wherein said hydrolysis catalytic converter (8) is installed in a downstream end portion (4a') of said tubular portion (4a) of said second exhaust gas manifold section (4).

12. An exhaust gas system according to claim 11, wherein said end tubular portion (4a') simultaneously forms an outer housing wall of said hydrolysis catalytic converter (8) and forms an inner housing wall for said annular oxidation catalytic converter (7) or serves as a support for the latter.

13. An exhaust gas system according to claim 1, wherein a section (3') of said first exhaust gas manifold (3) opens laterally into said tubular portion (3a) of said first exhaust gas manifold section (3) of said first exhaust gas section (3) either at an angle or perpendicular to a longitudinal axis of said tubular portion.

14. An exhaust gas system according to claim 1, wherein a section (4') of said second exhaust gas manifold section (4) opens coaxially into said tubular portion (4a) of said second exhaust gas manifold section.

15. An exhaust gas system according to claim 1, wherein said reduction agent is an aqueous urea solution, and wherein a flow mixer (16) is installed in said tubular portion (4a) of said second exhaust gas manifold section (4) upstream of said hydrolysis catalytic converter (8).

16. An exhaust gas system according to claim 1, wherein an evaporator or a heating device (17) is disposed in said tubular portion (4a) of said second exhaust gas manifold section (4) upstream of said hydrolysis catalytic converter (8) for accelerating evaporation of said reduction agent.

17. An exhaust gas system according to claim 1, wherein said housing (11) is additionally configured as a preliminary muffler.

18. An exhaust gas system according to claim 1, wherein said at least one further catalytic converter disposed in said main exhaust gas manifold (9) is at least one of the group consisting of SCR catalytic converters (10), ammonia suppression catalytic converters (10a), particle oxidation catalytic converters (10b), and nitrogen dioxide suppression catalytic converters (10c).

19. An exhaust gas system according to claim 18, wherein a main muffler (19) is disposed in said main exhaust gas manifold (9), and wherein at least said at least one SCR catalytic converter (10) is installed in said muffler (19).

* * * * *